Patented Aug. 3, 1954

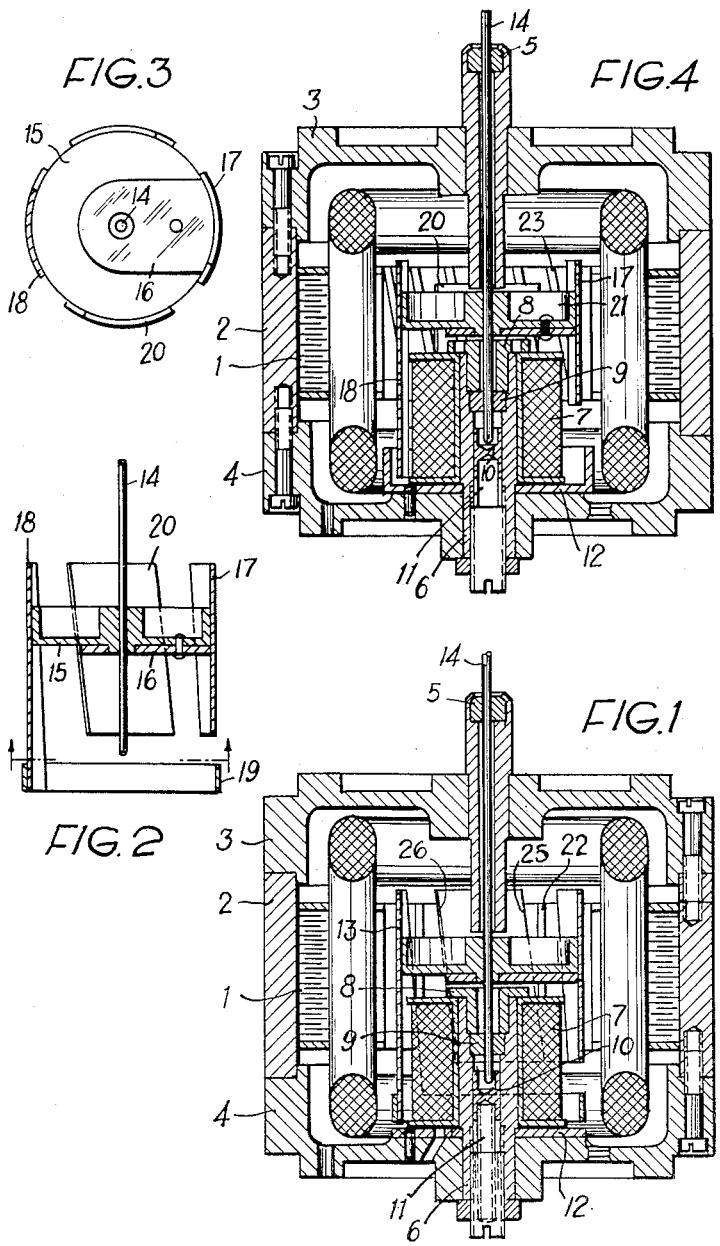

2,685,656

UNITED STATES PATENT OFFICE 2,685,656

ELECTRIC MACHINE FOR DATA TRANSMISSION

Sven Gunnar Soredal, Stockholm, and Henry Eugen Reit, Bromma, Sweden, assignors to Svenska Ackumulator Aktiebolaget Jungner, Stockholm, Sweden, a corporation of Sweden Application December 15, 1952, Serial No. 325,922

Claims priority, application Sweden December 27, 1951

9 Claims. (Cl. 310—49)

The present invention relates to an electric machine for data transmission.

In data transmission systems it is known inter alia to use electric machines having a stator of annular shape comprising a stator winding which is provided in slots in the stator body, a rotor mounted rotatably within the stator and coaxially therewith, said rotor having one or more pole elements which are polarized by a fixed polarizing coil. Such machines may be used for direct transmission of inter alia angle data or for operating a servo in transmission systems. In such cases where the torque required in the receiver of the transmission system is very small, for instance when the receiver shall only be able to move an index pointer, the pole element or elements are separated from the magnetic core or mantle of the polarizing winding and coupled magnetically to said core or mantle via one or more air gaps (magnetic slip ring indicator). The transmitter may be of a similar construction or may be provided in known manner with metallic slip rings on a rotor having a rotor winding. The transmitter is usually designed generally as a two-phase or multi-phase synchronous machine and fed by an alternating current.

In electric machines of the kind referred to above the torque generated by the receiver is usually very small, whereas it is often desired to obtain a high torque by small transmitted currents.

One object of the invention is to provide an electric machine for data transmission which is capable of generating, when small currents are transmitted, considerably higher torques than those obtained in machines hitherto used.

Another object of the invention is to provide an electric machine for data transmission of considerably increased compactness and stability.

It is also an object of the invention to provide, in addition to the pole elements, further magnetic elements inter alia in order to increase still more the torque generated in said machine.

An electric machine for data transmission comprises, according to the invention, a stator, stator windings provided in slots therein, a rotor provided in said stator and coaxially therewith, said rotor being provided with two pole elements, the axial length of which being substantially at least equal to the axial length of said slots in the stator, a polarizing coil for polarizing said pole elements comprising a core arranged coaxially with the stator and fixed at one end with respect thereto and a polarizing winding provided around said core, one of said pole elements being coupled magnetically to the fixed end of said core via a first air gap and the other pole element being coupled magnetically to the free end of the core via a second air gap, and the distance between said first air gap and the longitudinal axis of the rotor being substantially greater, and the distance between the second air gap and the rotor axis being less than the greatest distance between outer surface of the polarizing winding and the axis of the rotor.

In one embodiment of the invention at least one of said air gaps is provided in such manner that the attraction forces between the surfaces confining said air gap are wholly or at least partly parallel to the axis of the rotor.

The pole elements of the rotor may consist of plates of magnetic material forming parts of one and the same surface of rotation.

The compactness and stability of the electric machine according to the invention is improved by securing the pole elements to a rotor body of insulating material and by mounting said rotor body on the rotor axis well inside the stator, as seen in an axial direction, and by mounting the core of the polarizing coil so as to extend inside the stator to the vicinity of said rotor body. In this case the rotor body is preferably provided with a magnetically conducting element connected directly to one of said pole elements and coupled to the free end of the core of the polarizing coil via an axial air gap.

A further improvement in the electric machine of the kind referred to is obtained, according to another feature of the invention, by providing the rotor with magnetic shunt elements at opposite sides of the rotor with respect to the pole element or elements thereof, said shunt elements being magnetically insulated from the pole element or elements and from the polarizing magnet and arranged so as to pass a certain amount of magnetic flux between the temporary poles of the stator.

In order to obtain a high degree of accuracy in the rotary movement of the rotor either the slots in the stator or the longitudinal edges of the pole elements of the rotor may be biased so as not to be parallel with the rotor axis. The shunt elements, if provided, may also be biased in similar manner.

The invention will hereinafter be more fully described with reference to the accompanying drawing showing by way of example two embodiments thereof.

Fig. 1 is a sectional view along the axis of one embodiment of an electric machine according to the invention.

Fig. 2 is a sectional view of the rotor of the machine as shown in Fig. 1 taken along the axis of the rotor.

Fig. 3 is a sectional view of the rotor according to Fig. 2 taken perpendicularly to the axis of the rotor.

Fig. 4 is a sectional view of another embodiment of the invention taken along the axis thereof.

In Figs. 1 and 4 reference numeral 1 designates the stator of an electric machine for data transmission, the stator being provided for instance with a two-phase or three-phase stator winding. In the following description it is assumed that the winding is a three-phase winding. The stator is inserted in a housing consisting of a cylindrical part 2 and two end parts 3 and 4. The end part 3 supports by means of a central tube a sleeve bearing 5. An iron core 6 is fixed centrally in the other end part 4 and is surrounded by a polarizing winding 7. The iron core 6 is provided at its free end with a pole piece 8 of ferromagnetic material. The pole piece 8 and the iron core 6 are provided centrally with bores and in the bore of the core 6 a sleeve bearing 9 and an end bearing 10 are provided, the end bearing being axially movable against the action of a resilient means 11. This means may comprise one or more metal springs. However, it is most suitable to use a resilient body having increased damping properties, for instance a cylinder or a tube of rubber material, polytene or another suitable plastic material. At the end of the iron core facing the end part 4 of the housing a plate-shaped pole piece 12 of iron material is provided. The rotor 13 of the electric machine is supported in the bearings 5 and 9. The rotor in the embodiment shown in Fig. 1 is shown in detail in Figs. 2 and 3. It comprises a spindle 14 on which a rotor body 15 of non-magnetic material, for instance aluminum, is rigidly mounted. A plate 16 of magnetically conducting material is attached to the rotor body and comprises a ring-shaped portion facing the pole piece 8 of the free end of the core 6 and an extension machined to the same outer diameter as that of the rotor body 15.

Two pole elements 17 and 18 are secured to the rotor body 15 of non-magnetic material. The one 17 of these pole elements abuts against the plate 16 of the rotor body and the other pole element 18 is fixed to the rotor diametrically opposite to the pole element 17. The pole elements are plate-shaped and form parts of the same surface of rotation with respect to the rotor axis 14. The pole element 18 is provided with an extension in axial direction, an iron ring 19 being fixed to the free end of the extension and the inner diameter of the ring 19 being substantially the same as the outer diameter of the rotor body 15. With the rotor inserted in the electric machine a first air gap is left between the ring 19 and the pole plate 12 and a second air gap is left between the plate 16 and the pole piece 8 of the core of the polarizing coil 7. The distance between said first air gap and the axis of the rotor is greater, and the distance between said second air gap and the rotor axis is smaller than the maximum outer diameter of the polarizing coil 7. In other words, the diameters of the pole pieces 17, 18 and ring 19 are greater than the diameter of the polarizing coil 7 so that the rotor can easily be inserted in the machine with the pole elements extending about the polarizing coil upon removal of the end part 3 from the cylindrical part 2 of the stator. Two further plates 20 of magnetic material are fixed to the rotor at diametrically opposite sides thereof. These plates and the function thereof will be described later in detail.

In Fig. 4 a somewhat different embodiment of the electric machine according to the invention is shown. In this embodiment the pole piece 12 at the fixed end of the core 6 of the polarizing coil 7 is formed with a cylindrical flange which together with said extension of the pole element 18 of the rotor forms an air gap, over which the magnetic flux from the fixed end of the core 6 is passed to the pole element 18. The extension of the pole element 18 is in the embodiment according to Fig. 4 not provided with a ring member 19 as in Fig. 1, so that the air gap between said extension and the cylindrical part of the pole piece 12 "follows" the rotary movement of rotor.

In operation a main magnetic flux is generated by the polarizing winding 7 of the embodiments shown in Figs. 1 and 4 and passes from the pole piece 8 via an axial air gap to the plate 16 and further to the pole element 17 of the rotor. From this pole element the magnetic flux passes over a radial air gap to the stator 1 and passes further through the stator teeth and the stator body to the other pole element 18 via a radial air gap between this pole element and the stator. Finally, the magnetic flux passes through the pole element 18 and its extension via an air gap to the other pole piece 12 at the fixed end of the polarizing coil, said last mentioned air gap being an axial air gap between the pole piece 12 and the ring 19 in the embodiment shown in Fig. 1 and a radial air gap between the pole piece 12 and the extension of the pole element 18 in the embodiment shown in Fig. 4.

If the electric machine is used as a receiver in a data transmission system the stator windings are connected via the transmission line to the stator windings of the transmitter. The transmitter generates three voltages of equal phase but varying in amplitude in accordance with the angular position of the rotor of the transmitter. When the rotor of the receiver occupies an angular position corresponding to that of the rotor of the transmitter the voltages in the stator windings of the receiver generated by the main magnetic flux produced by the polarizing coil may be equal to the voltages applied to the stator windings by the transmission line. However, this is not necessary in that the voltages induced in the receiver may be considerably lower. This has been proved to be more advantageous, since the coupling between the polarizing windings 7 and the stator windings is rather weak. In the latter case a current will therefore pass through the stator winding and generate a magnetic flux that passes the same way as said main flux from the polarizing winding but in opposite direction to the latter flux. The magnetic leakage in the electric machine is considerable so that said main magnetic flux is only a small part of the total flux generated by the polarizing winding. Said magnetic fluxes give rise to forces of attraction between the rotor and the stator tending to turn the rotor to a position determined by the rotor of the transmitter. The corresponding torque on the rotor reaches its maximum value when the currents through the windings of the machine are equal in phase.

It has been proved by measurements that the phase displacement between the voltage and the current in the polarizing winding 7 is considerably greater than the corresponding phase displacement in the stator windings. In order to increase the phase displacement in the stator windings the rotor body has been provided, according to the invention, with shunt elements 20 of magnetic material which are magnetically insulated from the pole elements of the rotor and from the polarizing coil. In the embodiments according to Figs. 1 and 4 the shunt elements are formed as plates forming parts of the same surface of rotation with respect to the axis of the rotor. In Fig. 1 the axial length of the shunt elements is greater than the axial length of the stator, and in Fig. 4 the axial length of the shunt elements is smaller than the axial length of the stator. As seen in a cross section of the rotor, for instance as seen in Fig. 3, the shunt elements are mounted on diametrically opposite sides of the rotor and symmetrically with respect to the line of symmetry of the rest of the rotor section. The shunt plates serve to pass an extra magnetic flux between the temporary magnetic poles of the stator, said flux entering the shunt plates at one edge 25 thereof and leaving said shunt plates at the other edge 26 thereof. This magnetic flux reaches its maximum value when the position of the rotor of the receiver corresponds to that of the rotor of the transmitter. Thus, the shunt plates per se increase the torque of the rotor of the receiver and, moreover, bring the stator and rotor fluxes into better phase agreement and thus also act to increase the torque effected by the pole elements 17 and 18 of the rotor. Of course the shunt plates 20 give the same torque when the misalignment between the rotor of the receiver and that of the transmitter is 180°. For this reason the torque from the shunt plates 20 must not be too great as compared with the torque from the pole elements 17 and 18, and this circumstance must be considered when designing the pole elements 17 and 18 and the shunt plates 20 for a given number of ampere turns of the polarizing winding 7 and of the stator windings.

In order that the rotor of the receiver may follow that of the stator with maximum accuracy either the slots in the stator or the longitudinal edges of the pole elements and those of the shunt elements ought to be biased so as not to extend parallel to the rotor axis. In Fig. 1 the slots 22 in the stator are parallel to the axis of the rotor and the longitudinal edges of the pole elements 17 and 18 and those of the shunt elements 20 are biased with respect to said axis, whereas in Fig. 4 the stator slots 23 are biased and the edges of the pole elements and those of the shunt elements are parallel to the rotor axis. The degree of bias over the effective length of the biased elements may preferably be one or one half of the slot pitch of the stator, and depends also of the manner in which the stator windings are provided. It has proved to be advantageous to make the circumferential width of the pole and shunt plates equal to a whole number of stator slot pitches.

According to the invention the forces of attraction between the surfaces facing at least one of the air gaps passing the magnetic flux of the polarizing coil to the pole elements are parallel to the axis of the rotor of the machine or oblique with respect thereto. Said forces will consequently vary with the alternating magnetic flux and vibrate the rotor in an axial direction. This vibration eliminates the start or rest friction in the rotor bearings, so that the rotor is rotated to the desired position even by very weak transmitted currents.

What we claim is:

1. An electric machine for data transmission comprising a stator, multiphase stator windings provided therein, a rotor rotatably mounted coaxially in the stator and provided with pole elements of magnetic material, a core coaxially fixed at one of its ends with respect to the stator, a polarizing winding on said core, one of the pole elements of the rotor being magnetically coupled to the fixed end of said core via a first air gap and the other of said pole elements being coupled to the free end of the core via a second air gap, the diameter of said pole elements being greater than the maximum diameter of said polarizing coil, whereby said rotor may be introduced axially into said stator with the ends of said pole elements extending about said polarizing coil.

2. An electric machine for data transmission as claimed in claim 1 in which the surfaces defining at least one of said air gaps extend transversely of the axis of said rotor, whereby the forces of attraction due to magnetic flux passing said air gap have a component extending parallel to the axis of the rotor.

3. An electric machine for data transmission as claimed in claim 1 in which the pole elements of the rotor consist of curved plates forming parts of substantially the same surface of rotation.

4. An electric machine for data transmission comprising a stator, multiphase stator windings provided therein, a rotor rotatably mounted coaxially in the stator, said rotor comprising a shaft, a rotor body of non-magnetic material and two pole elements provided on the rotor body, a core rigidly and coaxially mounted at one of its ends with respect to the stator and extending into the stator to the centre portion thereof to terminate short of said rotor body, magnetic material pole pieces at each end of said core, a polarizing winding on said core and a magnetic conductor on said rotor body in contact with one of said pole elements, said magnetic conductor and associated pole element being spaced from the pole piece at the free end of said core by an air gap, and said other pole element being spaced from the pole piece at the fixed end of said core by a second air gap.

5. An electric machine for data transmission comprising a stator, multiphase stator windings provided in slots in the stator, a rotor rotatably mounted coaxially in the stator, said rotor comprising a shaft and a rotor body of non-magnetic material provided with two pole plates of magnetic material the axial length of which is substantially at least as great as the axial length of the slots of the stator, a core rigidly and substantially coaxially mounted at one of its ends with respect to the stator and terminating short of said rotor body, magnetic material pole pieces at each end of said core, a polarizing winding on said core, and a magnetic conductor on said rotor body and connected to one of said pole plates; said magnetic conductor being spaced by a substantially axial air gap from said pole piece at the free end of said core and a magnetically conducting part of the other pole plate being spaced from said magnetic material pole piece at the fixed end of said core by a substantially radial air gap.

6. An electric machine for data transmission comprising a stator, stator windings provided therein, a rotor rotatably and coaxially mounted in the stator and provided with pole means of magnetic material, a polarizing coil for polarizing said pole means, and means magnetically insulated from said pole means and said polarizing coil for passing a preselected part of the magnetic flux between the temporary magnetic poles of the stator; said flux passing means comprising shunt elements of magnetic material on the rotor and symmetrically disposed with respect to said pole means.

7. An electric machine for data transmission as claimed in claim 6, wherein the shunt elements consist of curved plates forming parts of substantially the same surface of rotation.

8. An electric machine for data transmission as claimed in claim 6, wherein said shunt elements extend in a longitudinal direction with respect to the rotor axis and the longitudinal edges of the shunt elements are inclined with respect to said axis.

9. An electric machine for data transmission comprising a stator, multiphase stator windings provided in slots in the stator, a rotor rotatably mounted coaxially in the stator and provided with pole means of magnetic material, a polarizing coil rigidly mounted with respect to the stator for polarizing said pole means, two shunt elements of magnetic material on the rotor and insulated magnetically from the pole means thereof and from said polarizing coil, said shunt elements extending in a longitudinal direction with respect to the rotor at diametrically opposite sides thereof, and, as seen in a transverse section of the rotor, being arranged symmetrically with respect to the line of symmetry of the pole means.

References Cited in the file of this patent

UNITED STATES PATENTS

| Number | Name | Date |
|---|---|---|
| 1,706,149 | Ellis | Mar. 19, 1929 |
| 1,715,311 | Sperry | May 28, 1929 |
| 2,461,053 | Granet | Feb. 8, 1949 |